US011713569B2

(12) United States Patent
Scott et al.

(10) Patent No.: US 11,713,569 B2
(45) Date of Patent: Aug. 1, 2023

(54) STORMWATER TREATMENT DEVICE

(71) Applicant: CONTECH ENGINEERED SOLUTIONS LLC, West Chester, OH (US)

(72) Inventors: Jordan Douglas Scott, Vancouver, WA (US); Mathew Edward Bauer, Gresham, OR (US); Michael Benjamin Brooks, Battle Ground, WA (US)

(73) Assignee: CONTECH ENGINEERED SOLUTIONS LLC, West Chester, OH (US)

( * ) Notice: Subject to any disclaimer, the term of this patent is extended or adjusted under 35 U.S.C. 154(b) by 54 days.

(21) Appl. No.: 17/397,252

(22) Filed: Aug. 9, 2021

(65) Prior Publication Data
US 2022/0049486 A1     Feb. 17, 2022

Related U.S. Application Data

(60) Provisional application No. 63/064,651, filed on Aug. 12, 2020.

(51) Int. Cl.
*B01D 33/067*     (2006.01)
*E03F 5/14*        (2006.01)
(Continued)

(52) U.S. Cl.
CPC ............ *E03F 5/14* (2013.01); *B01D 21/0042* (2013.01); *B01D 33/067* (2013.01); *B01D 33/11* (2013.01);
(Continued)

(58) Field of Classification Search
CPC ...... B01D 33/067; B01D 33/11; B01D 33/68; B01D 33/76; B01D 2201/583
(Continued)

(56) References Cited

U.S. PATENT DOCUMENTS 3,936,378 A * 2/1976 Kawada ................. B01D 33/11
                                                         210/403
5,685,983 A * 11/1997 Frykhult ................ B01D 33/11
                                                         210/403
(Continued)

FOREIGN PATENT DOCUMENTS

CN       2918569 Y      7/2007
DE  102005019001 A1    10/2006
(Continued)

OTHER PUBLICATIONS

PCT, International Search Report and Written Opinion, International Application No. PCT/US2021/45199; dated Nov. 30, 2021, 13 pages.

*Primary Examiner* — Christopher Upton
(74) *Attorney, Agent, or Firm* — Thompson Hine LLP

(57) ABSTRACT

A stormwater treatment device includes a tank defining an internal volume and having an inlet and an outlet, a rotatable screen unit mounted within the tank, the rotatable screen unit being barrel-shaped to define a through path with an inlet end and an outlet end. The rotatable screen unit includes a screen structure with a plurality of screening openings for allowing passage of at least some water from the through path outwardly through the screen structure while inhibiting passage of trash items through the screen structure such that trash items move along the through path from the inlet end to the outlet end. The rotatable screen unit includes a plurality of external drive paddles that rotate with the screen structure and that interact with water that has been screened by passing outwardly through the screen structure interacts with the external drive paddles to cause rotation of the rotatable screen unit.

22 Claims, 20 Drawing Sheets

(51) Int. Cl.
    *B01D 21/00*    (2006.01)
    *B01D 33/76*    (2006.01)
    *B01D 33/11*    (2006.01)

(52) U.S. Cl.
    CPC ........ *B01D 33/76* (2013.01); *B01D 2201/583* (2013.01); *B01D 2221/12* (2013.01)

(58) Field of Classification Search
    USPC ........ 210/157, 161, 170.03, 403, 747.3, 784
    See application file for complete search history.

(56) References Cited

U.S. PATENT DOCUMENTS

| | | | |
|---|---|---|---|
| 6,868,973 B1 * | 3/2005 | Kamo | B01D 33/11 210/403 |
| 7,527,731 B2 | 5/2009 | Su | |
| 10,309,089 B2 | 6/2019 | Babcanec | |
| 10,344,466 B2 | 7/2019 | Kent | |
| 2003/0034286 A1 | 2/2003 | Butler | |
| 2004/0262204 A1 | 12/2004 | Buckett | |
| 2012/0255896 A1 * | 10/2012 | Courtemanche | B01D 33/067 210/403 |
| 2015/0174512 A1 * | 6/2015 | Kluit | B01D 33/11 210/403 |

FOREIGN PATENT DOCUMENTS

| | | |
|---|---|---|
| JP | 4401969 | 1/2010 |
| KR | 101304128 | 9/2013 |
| KR | 101867483 | 6/2018 |
| WO | WO 9627422 A1 | 9/1996 |

\* cited by examiner

STORMWATER TREATMENT DEVICE

TECHNICAL FIELD

This application relates generally to stormwater treatment devices that receive stormwater runoff, and, more particularly, to a stormwater treatment device with enhanced floatables and/or debris removal and retention.

BACKGROUND

The protection of ground water and natural bodies of water requires systems for diverting and/or treating water that contacts roadways, parking lots, and other man-made structures. A variety of stormwater treatments systems exist. Current stormwater trash capture products use direct screening techniques which clog very easily and have low treatment capacities. As most such systems fill with trash, treatment capacity diminishes, and the only solution is to repeatedly clear the screen via cumbersome maintenance.

Accordingly, it would be desirable to provide a stormwater treatment device with a screening feature that is less likely to clog.

SUMMARY

In one aspect, a stormwater treatment device includes a tank defining an internal volume and having an inlet and an outlet. A rotatable screen unit is mounted within the tank, the rotatable screen unit being barrel-shaped to define a through path with an inlet end and an outlet end, the rotatable screen unit having a plurality of screening openings for allowing passage of water therethrough while preventing passage of trash items. The rotatable screen unit that is configured to be rotatably driven by water flow through the treatment device.

In another aspect, a stormwater treatment device includes a tank defining an internal volume and having an inlet and an outlet, with a rotatable screen unit mounted within the tank, the rotatable screen unit being barrel-shaped to define a through path with an inlet end and an outlet end. The rotatable screen unit includes a screen structure with a plurality of screening openings for allowing passage of at least some water from the through path outwardly through the screen structure while inhibiting passage of trash items through the screen structure such that trash items move along the through path from the inlet end to the outlet end. The rotatable screen unit includes a plurality of external drive paddles that rotate with the screen structure and that drive rotation of the screen structure by interacting with water that has been screened by passing outwardly through the screen structure.

In a further aspect, a stormwater treatment device includes a tank defining an internal volume and having an inlet and an outlet, with a rotatable screen unit mounted within the tank, the rotatable screen unit being barrel-shaped to define a through path with an inlet end and an outlet end, the rotatable screen unit having a plurality of screening openings for allowing passage of water therethrough while preventing passage of trash items through the screening openings so that trash items within the through path move from the inlet end to the outlet end. The rotatable screen unit has a rotation axis that runs transverse to an inlet flow direction of water entering the inlet.

In still another aspect, a method of treating stormwater involves: flowing stormwater into a tank in which a rotating screen unit is located, the rotatable screen unit shaped to define an axial through path with an inlet end and an outlet end, the rotatable screen unit having a plurality of screening openings for allowing passage of water therethrough while preventing passage of trash items through the screening openings; and flowing the stormwater into the inlet end of the rotatable screen unit, wherein at least some stormwater passes through the screening openings for screening and interacts with externally located drive blades of the rotatable screen unit to drive rotation of the rotatable screen unit.

The details of one or more embodiments are set forth in the accompanying drawings and the description below. Other features, objects, and advantages will be apparent from the description and drawings, and from the claims.

DETAILED DESCRIPTION

Figure 1:
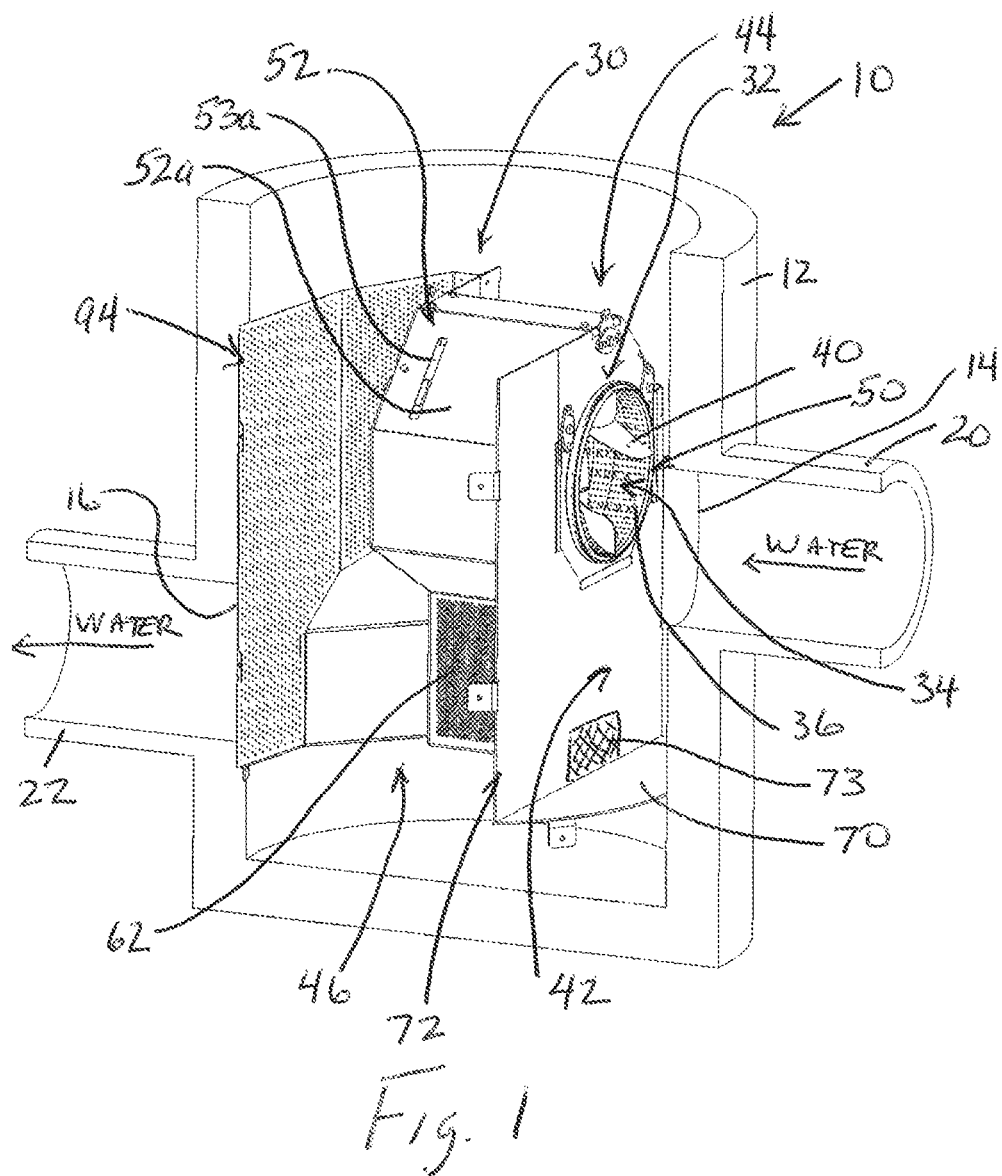
FIGS. 1 and 2 are partial perspective views of a stormwater treatment device with part of the tank cut away.
Figure 2:
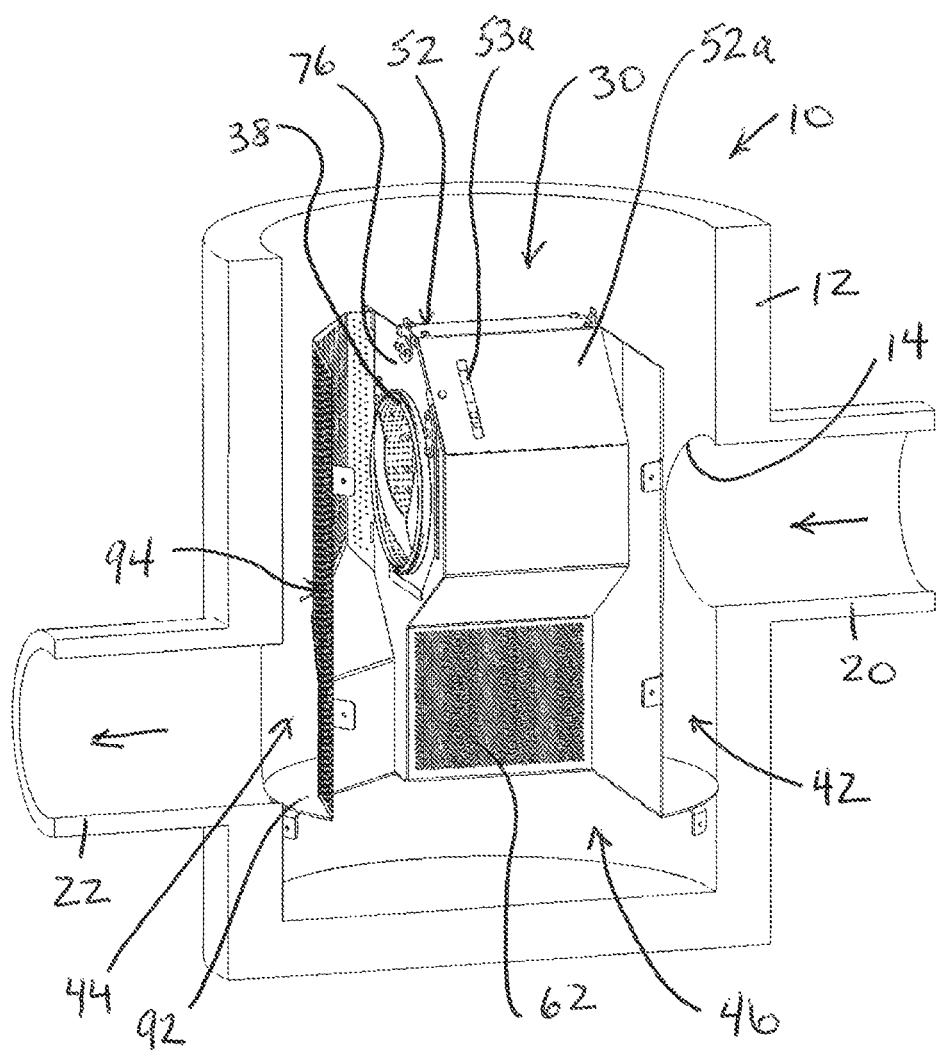
Figure 3:
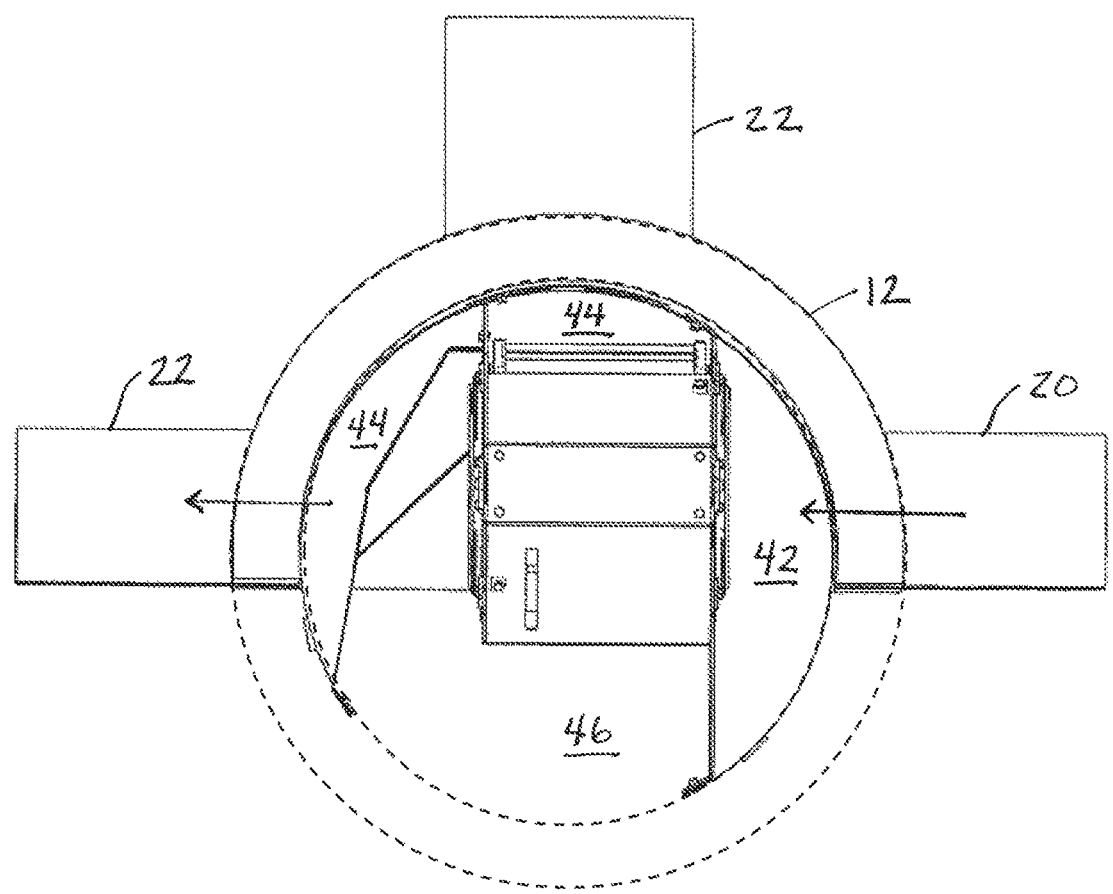
FIG. 3 is a top plan view of the stormwater treatment device.
Figure 4:
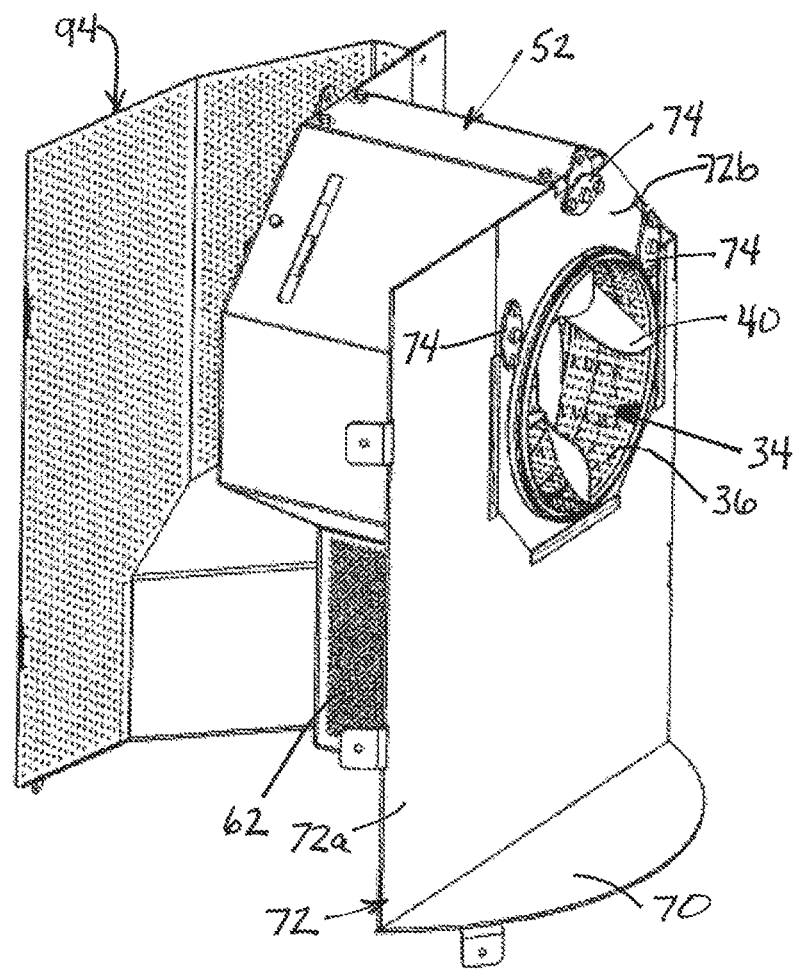
FIGS. 4 and 5 are perspective views of the insert of the stormwater treatment device.
Figure 5:
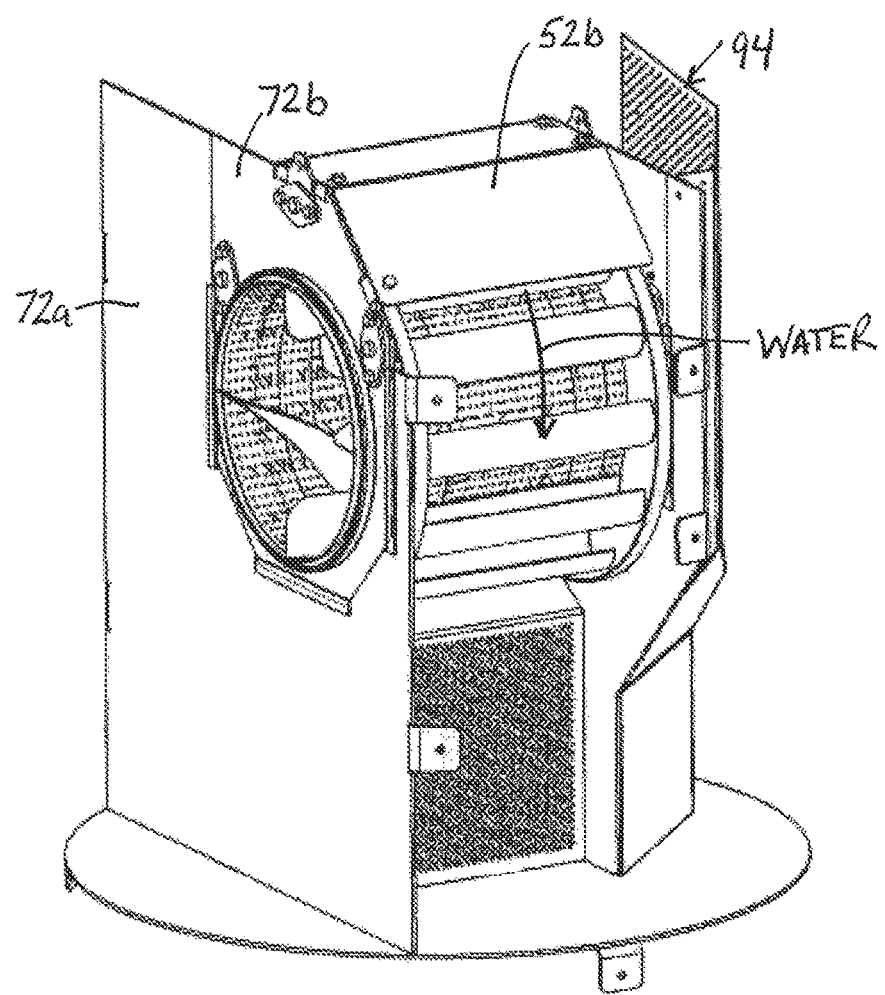
Figure 6:
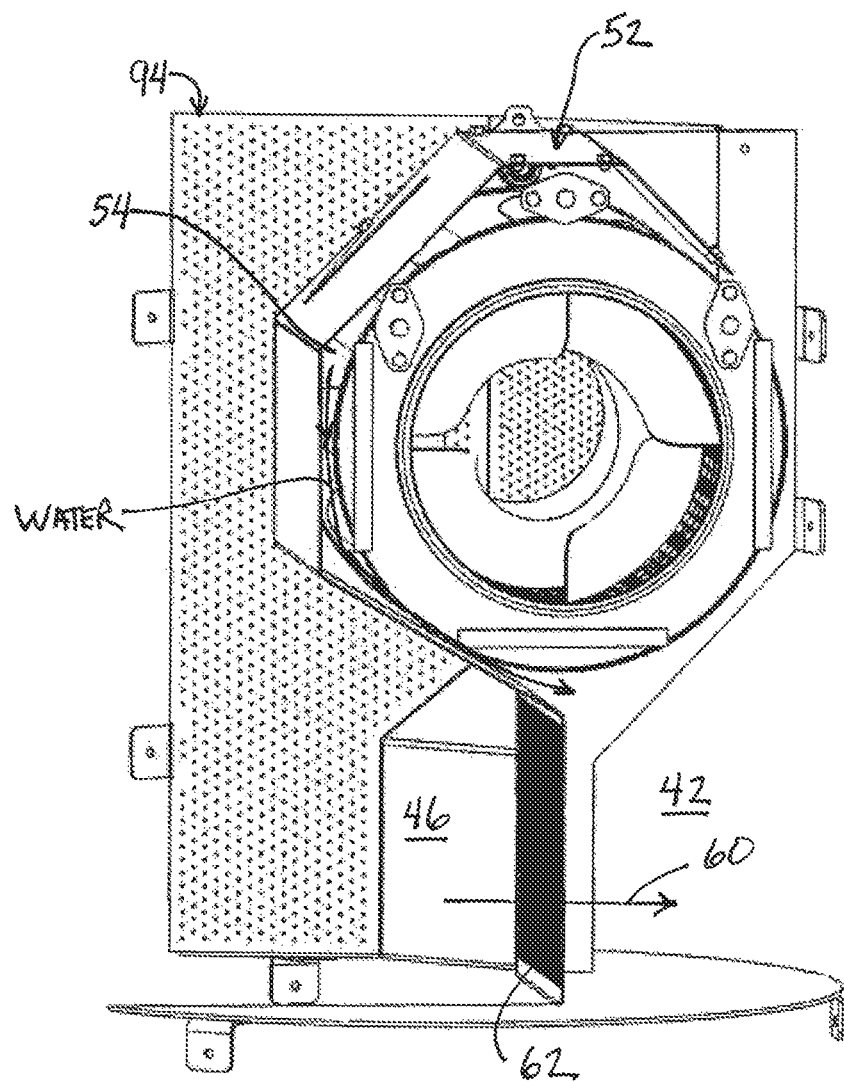
FIGS. 6-9 are partial perspective views (some components not shown) of the insert.
Figure 7:
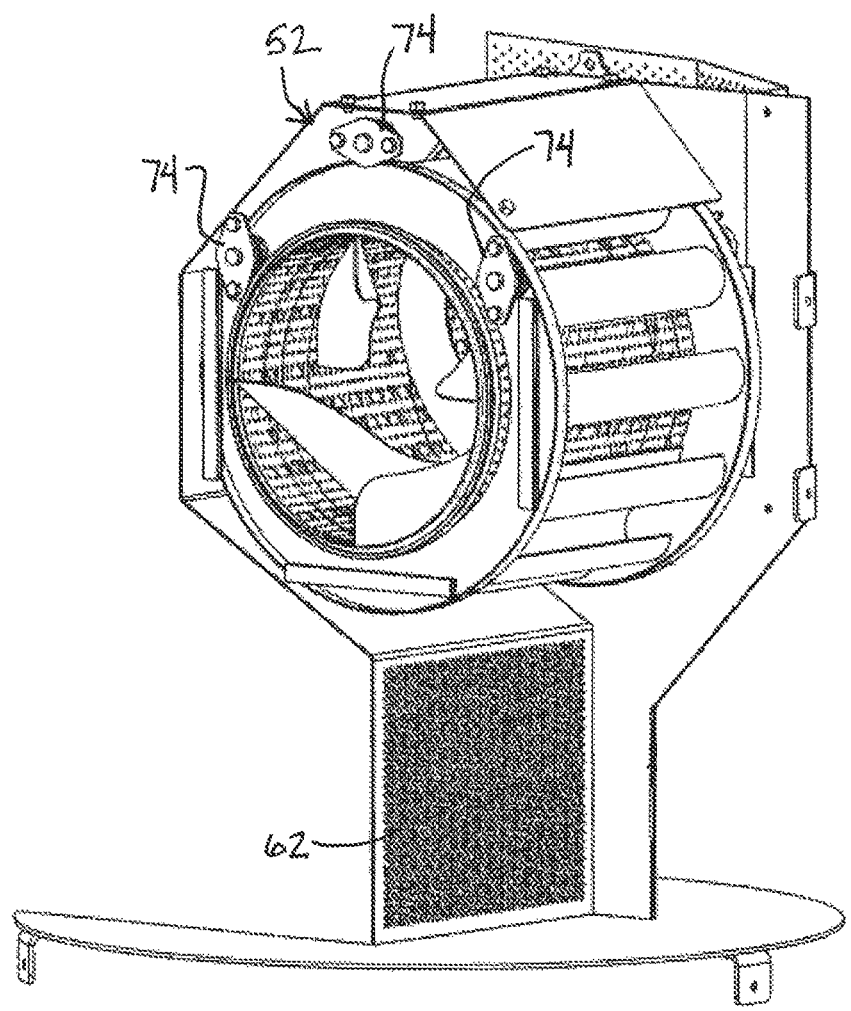
Figure 8:
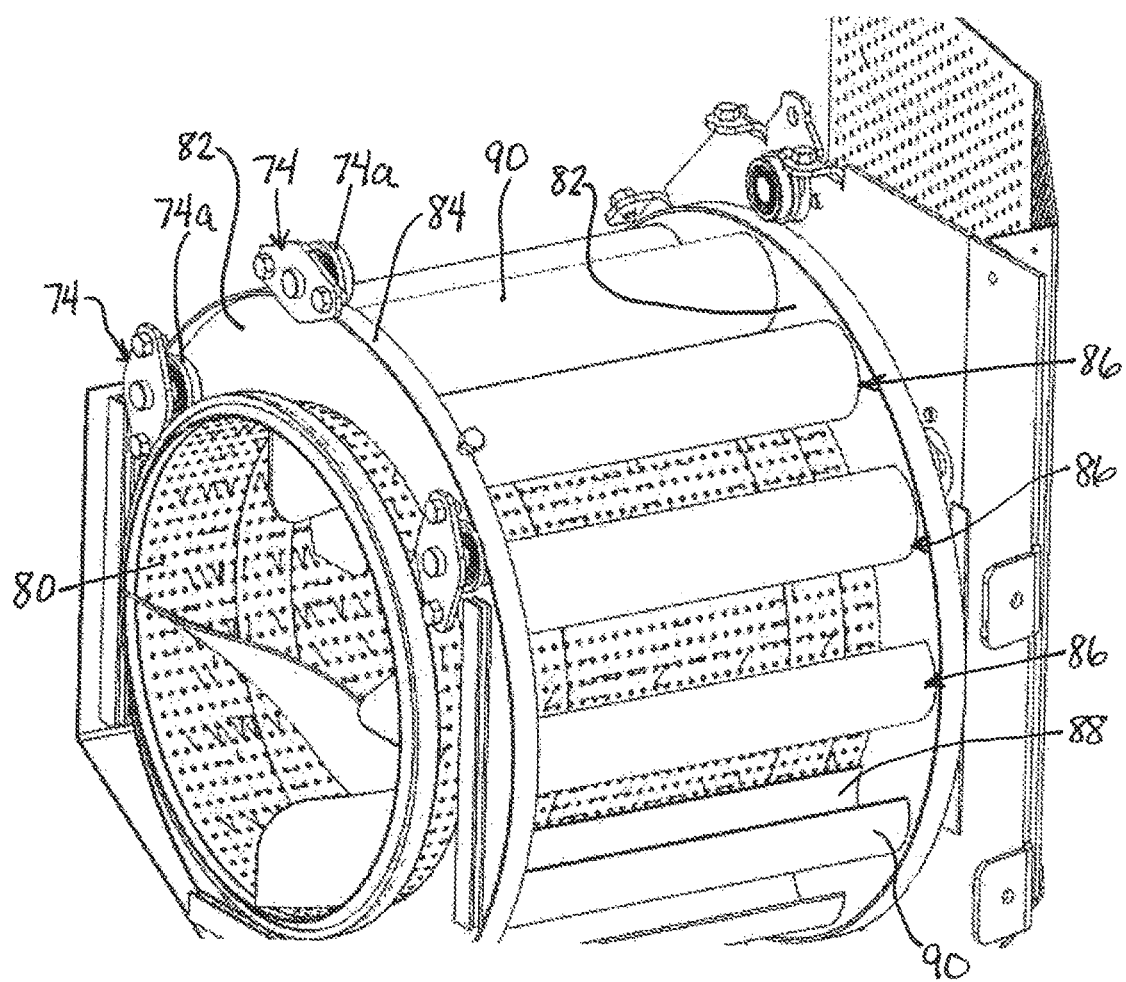
Figure 9:
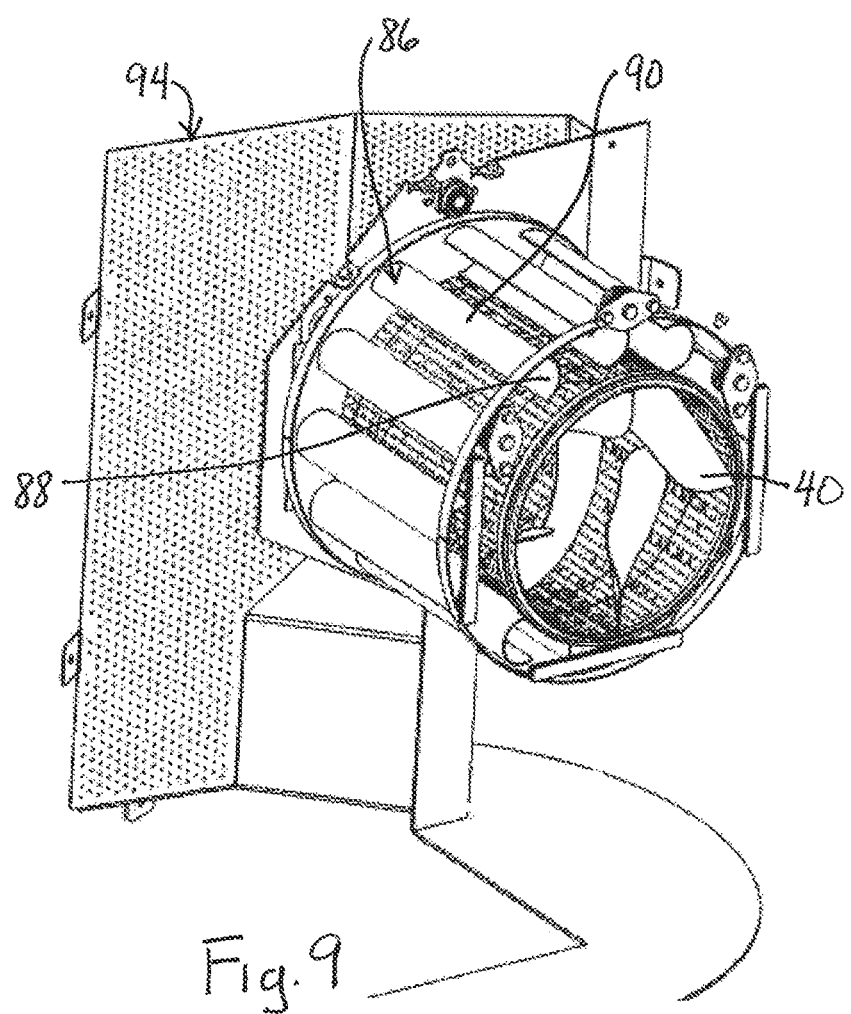

Referring to FIGS. 1-9, one embodiment of a stormwater treatment device 10 includes a cylindrical or rectangular or other shape tank 12 (e.g., a concrete manhole or vault, or a metal or plastic tank structure) with an inlet opening 14 and an outlet opening or openings 16 through the tank sidewall 18. An inlet pipe 20 connects to opening 14 and an outlet pipe/pipes 22 connect to the opening/openings 16. The tank includes an insert structure 30 that is configured to control flow through the tank. The tank insert 30 supports a rotatable screen unit 32 within the tank. The rotatable screen unit 32 is barrel-shaped (e.g., cylindrical (round or other), or cylindrical with tapered ends, or conical, or some other circumscribing tubular shape, all of which are encompassed by the term barrel-shaped) to define a through path 34 with an inlet end 36 and an outlet end 38. The rotatable screen unit has a tubular screen structure 80 with a plurality of screening openings (not shown in all views) for allowing passage of water therethrough while preventing passage of trash items. The rotatable screen unit 32 includes at least one internal blade 40 (e.g., one, two or more, or three or more) within the through path 34 such that water entering the inlet end 36 of the through path interacts with the internal blades 40.

The insert 30 is also configured to define an inlet bay 42, an outlet bay 44 and a trash bay 46. The inlet bay 42 is located around the inlet 14 of the tank and includes an outlet opening 50 positioned such that the inlet end 36 of the through path is open to the inlet bay 42 for water entry. The outlet bay 44 is located for delivering water to the outlet 16 of the tank. The trash bay 46 is located at least partly between inlet bay 42 and the outlet bay 44.

The insert also defines the support housing 52 for the rotatable screen unit 32. The support housing defines a path or paths 54 at an external surface side of the screen unit 32 for delivering water that passes through the screening openings to the outlet bay 44 without such water passing through the outlet end 38 of the rotatable screen unit 32 into the trash bay 46. Trash items that pass along the through path 34 and out of the outlet end 38 of the rotatable screen unit are captured within the trash bay 46. Plate segments 52a and 52b may include inspection slots, such as 53a, for viewing the internals to determine if cleaning or maintenance is needed.

The insert 30 also defines a flow path 60 from the trash bay 46 to the outlet bay 44, with a stationary screen unit 62 (aka trash bay screen) located along the flow path to maintain captured trash items with the trash bay. The helical configuration of the internal blades 40, in combination with the rotation of the screen unit 30, pushes trash items along the through path 34 and out of the outlet end 38 of the through path 34.

The inlet bay 42 is defined by a lower deck panel 70 and an upright wall 72 with wall segments 72a and 72b. Wall segment 72b includes the opening to receive an end portion of the rotatable screen unit and carries bearing assemblies 74 to rotatably support the screen unit 30. Wall segment 72a may include a lower area 73 that is perforated or screened to permit drain down under no flow conditions. An end wall segment 76 toward the outlet end of the screen unit also includes an opening and carries bearing assemblies 74 to rotatably support the screen unit 30. In this regard, the screen unit 30 includes the tubular screen structure 80 with the screening openings (not shown) and a frame structure with annular end panels 82, where each annular end panel 82 includes a peripheral rim 84 that is engaged by the bearing assemblies 74 (e.g., at each end, the rotating wheel 74a of one or more assemblies 74 engages with the internal surface of the rim 84 and the rotating wheel 74a of one or more assemblies 74 engages with the external surface of the rim 84). In this manner, the screen unit 30 is supported for free rotation by the bearing assemblies 74, and the bearing assemblies prevent axial movement of the screen unit 30. The upper most bearing assembly wheels 74a at each end prevent the screen unit from shifting vertically upward.

Notably, the frame structure of the screen unit 30 also includes a series of external drive paddles, which here take the form of trough structures 86, at the external side of the tubular screen structure 80 to form a paddle wheel type structure. Each trough structure has a water flow capture face 88 (here the concave face) and a water flow pass face 90 (here the convex face). The trough structures are oriented so that water flow passing through the tubular screen structure 80 at the outlet bay side will be captured by the water flow capture faces 88 and water flow passing through the screen structure toward the trash bay side will engage with and run off of the water flow pass faces 90. The combined effect is that the water flow passing through the tubular screen structure 80 interacts with the trough structures 86 in a manner to drive the rotation of the screen unit 30.

The upright wall 72 is configured such that if flow into the tank exceeds a rated flow rate for treatment, causing the water level in the inlet bay 42 to rise, the water will overflow at the lower section of the wall segment 72b directly into the outflow bay 44.

The outlet bay is defined by a lower deck panel 92 and an upright wall or walls 94, which here are at least partly perforated. The deck panel 92 may be integral with the deck panel 70 (e.g., formed of the same plate).

In a typical installation, the tank includes a top wall (not shown) that may include an access opening (e.g., a manhole) to enable access to the internal space of the tank when the stormwater treatment device is installed in the field.

In operation, device 10 receives flow through the inlet pipe 20 which enters the inlet bay 42. The system is designed to treat a specific capacity of water called the treatment flow rate. The inlet bay 42 allows sediment, and any heavy trash and debris to settle. From the inlet bay 42, stormwater travels into rotating screen unit 30, which separates trash items from the water. If the system experiences flow higher than the treatment flow rate, water will spill over the lower portion of the wall segment 72b, and over the rotating screen housing 52 and into the outlet bay 44 and exit via the outlet pipe 22.

As described above, the rotating screen unit 30 is supported by the bearing assemblies 74, which allow the unit to rotate. The kinetic energy of the water entering the inlet end 36 is converted into rotational energy of the screen unit by the internal blades 40. Water exits through the screening openings in the tubular screen structure 80, into the outlet bay 44 and then out via the outlet pipe 22. Multiple outlet pipes and/or angles of outlet pipe position may be used. Trash is separated from the stormwater as it passes through the rotating tubular screen structure 80 and is transported into the trash bay 46 via the internal blades 40. The combination of the trash migration across the screen and the turbulent water flow caused by deflection off the rotating blades 40 generates a scrubbing action, keeping the internal surface of the tubular screen structure clean. High water velocity across the screen at high flow conditions also keeps the screen clean to inhibit blinding of the screen.

The paddle wheel frame structure of the screen unit 30 assures that, at high flows, water exits through the tubular screen structure screening openings and deflects off the outer troughs causing the assembly to rotate with added power from the water deflection impact. At low flows, water exits through the screening openings of the tubular screen structure and fills the troughs, causing the system to rotate due to the weight of the water. If flow is too low to rotate the cylinder, the bottom of the tubular screen structure will blind with trash which causes the water elevation to rise and discharge into higher outer troughs. This causes rotation and cleans the blinded tubular screen structure, in return dropping the water surface elevation. This process is repeated and enables the rotating tubular screen structure cleaning action at all flow conditions.

Trash exits out of the rotating screen unit 30 and into the trash bay 46, which, optionally, has a large sump for storage. The trash bay screen 62 is positioned on the vertical wall under the rotating screen unit. The turbulent water exiting the rotating tubular screen structure falls to the deck 92 and back flushes the trash bay screen 62. This constant action enables the screen 62 to stay clean and not blind. Multiple trash bay screens could be provided. The screen(s) 62 help regulate the water surface elevation inside the trash bay 46 and enables the system to drain down, particularly during lower flow rates through the rotating screen unit that do not impinge upon the perforated wall(s) 94. At larger flows, water passes over the blades 40 of the screen unit, all the way through the through passage of the rotating screen unit 30 and onto the perforated outlet bay wall(s) 94. The water jetting effect on the perforated outlet wall(s) 94 keeps trash from blinding it and ensures the trash bay water surface elevation stays below the rotating screen unit 30.

Thus, the described stormwater treatment device provides numerous benefits, including the following.

The kinetic energy of the water entering the rotating screen unit 30 is translated into rotational energy, primarily by movement of the water to interact with the outer troughs. Due to the screen rotation and turbulent water flow, high- and low-pressure zones are created which allow the trash to be flushed from the low-pressure zones. This results in trash filled water always encountering clean screen enhancing the flow capacity and longevity of the system.

In the illustrated device 10, the internal surface side of the tubular screen structure of the rotating screen unit has two short and two long internal blades, both of which run helically. However, other blade configurations are possible. The blades have four main functions. First, the geometry of the internal blades diverts water higher up on the sides of the rotating screen unit so that as the water passes through the screen and impacts troughs, rotation of the rotating screen unit is imparted and maintained. Second, the internal blades have an optimal height to ensure large trash can easily pass through the rotating screen unit to the trash bay while containing as much water as possible from passing through the outlet end of the rotating screen unit. Third, the blades create high turbulence, varied flow directions, and differential pressure zones to promote screen cleaning. Fourth, the four blades act as an auger which moves axially trash though the screen unit, from one end to the other, as the screen unit rotates.

The tubular screen structure is encircled by troughs, which act as a paddle wheel for the unit. This is particularly important for lower flow rates to ensure the screen unit continues to rotate and facilitates self-cleaning. It also doubles as a structural frame member of the screen unit.

The suspended bearing design protects the system and keeps it out of the direct path of flow. The wheels are optimally spaced across the rotating screen unit to combat twisting and thrust forces. The bearing assembly is of a quick release design for ease of maintenance.

The rotating screen unit separates trash from stormwater and transports the trash it to the trash bay. Trash migrates through the rotating screen unit causing a scrubbing action which in return cleans the screen. Trash is stored in a designated area, the trash bay, for easier maintenance and it keeps the trash away from the screen so stored trash cannot re-enter the rotating screen unit and impede progress of incoming trash.

Figure 10:
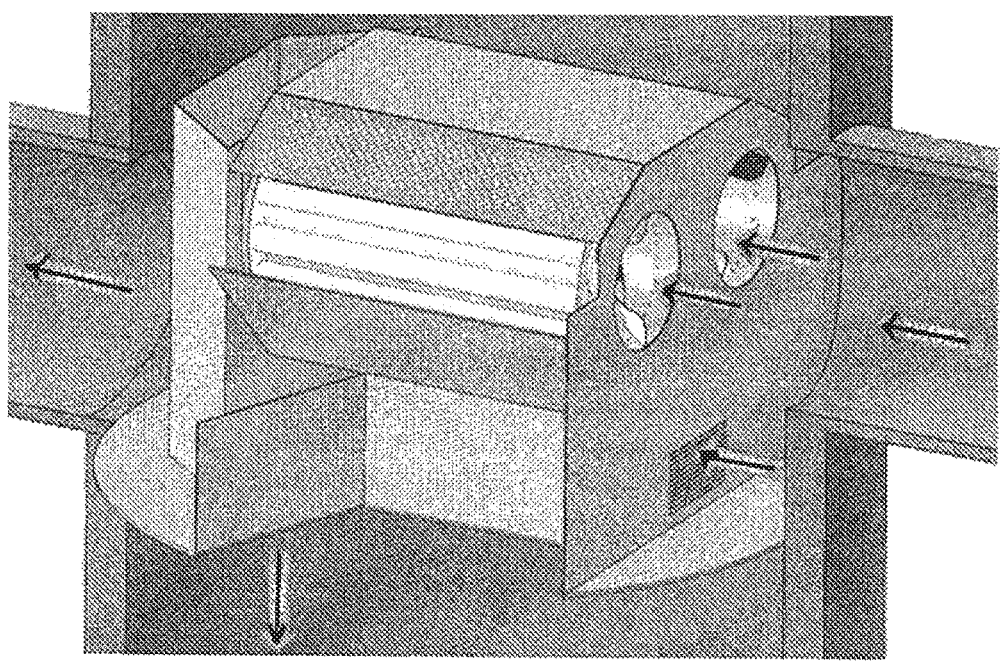
FIG. 10 is a partial perspective view of another embodiment of a stormwater treatment device.
Figure 11:
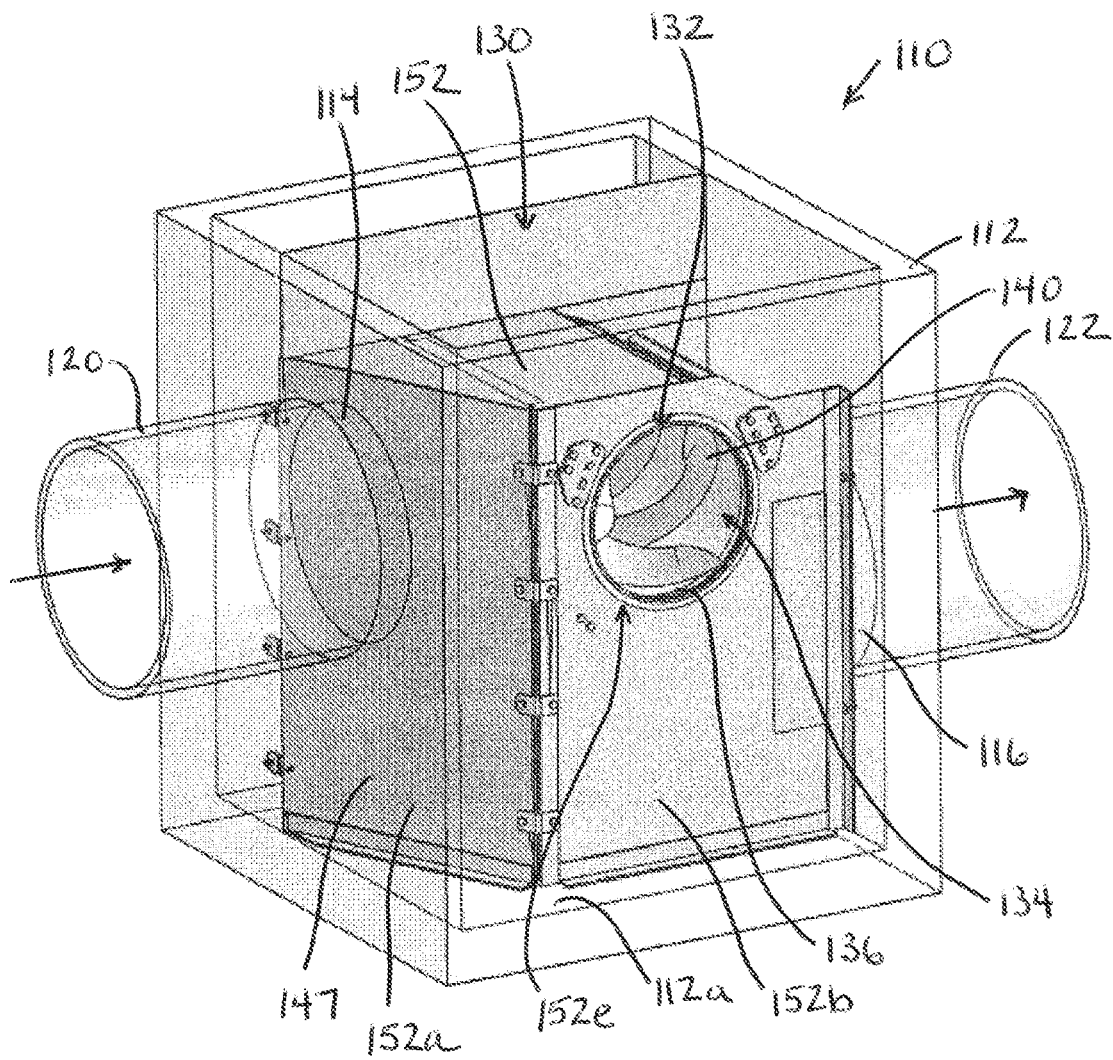
FIGS. 11 and 12 are perspective views of another embodiment of a stormwater treatment device, with walls of tank shown as transparent.
Figure 12:
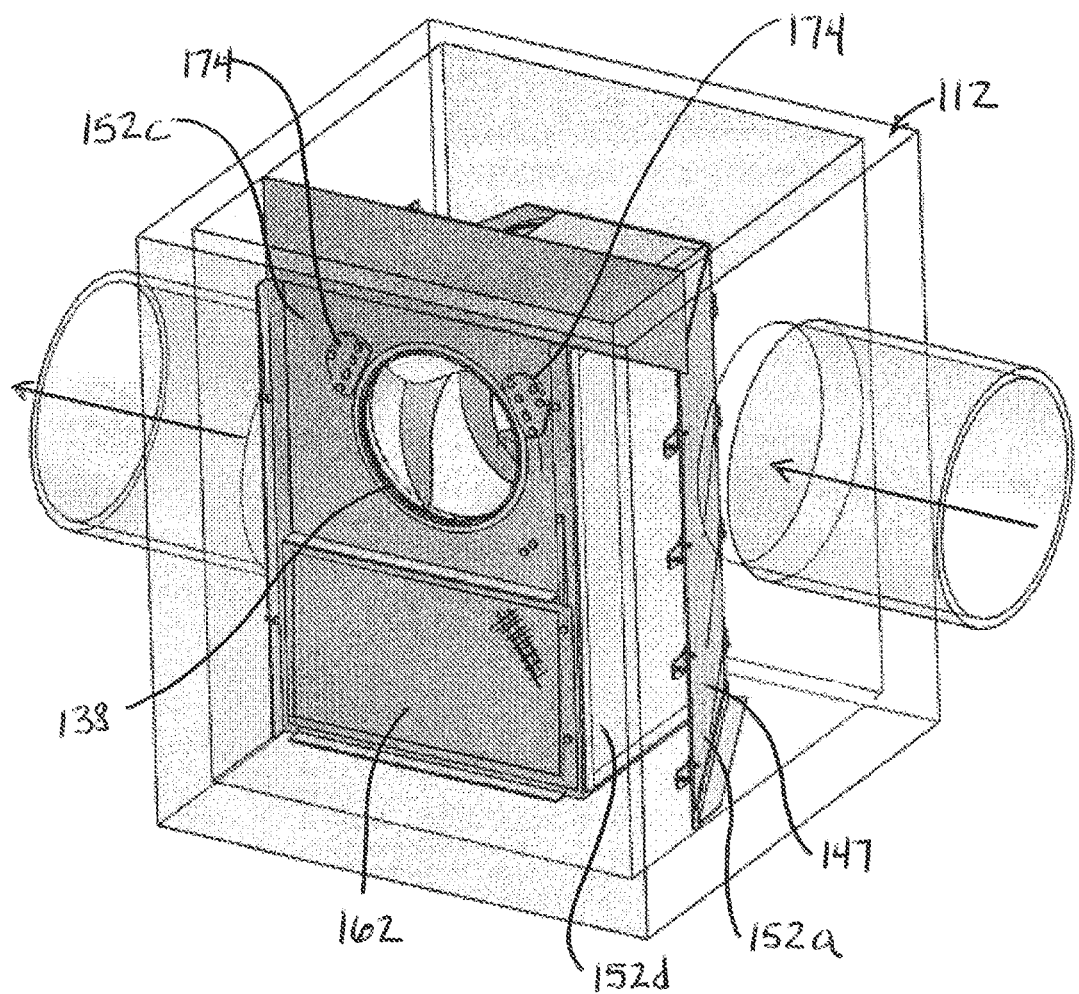
Figure 13:
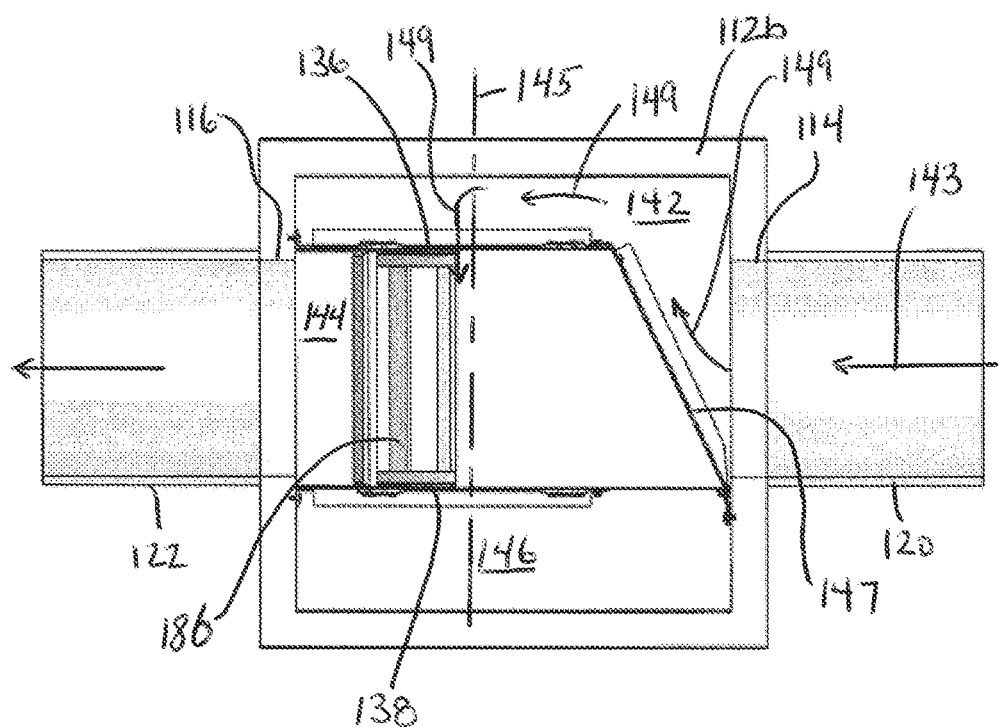
FIG. 13 is a top plan view of the treatment device of FIGS. 11 and 12.
Figure 14:
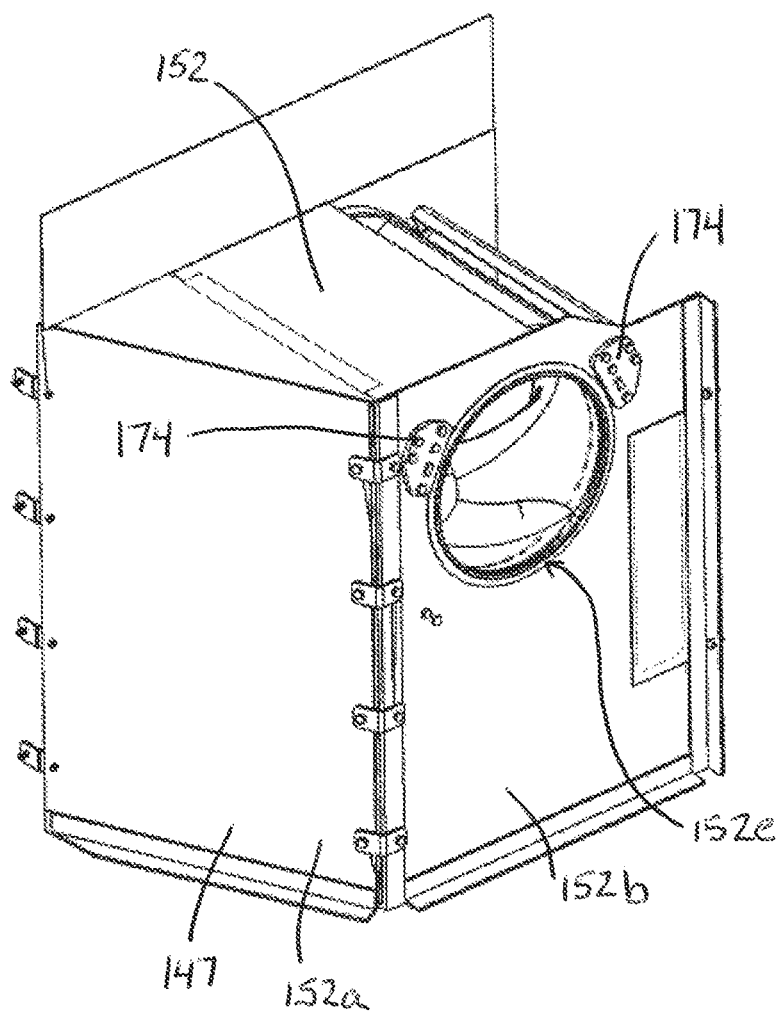
FIGS. 14 and 15 show perspective views of the insert of the treatment device of FIGS. 11 and 12.
Figure 15:
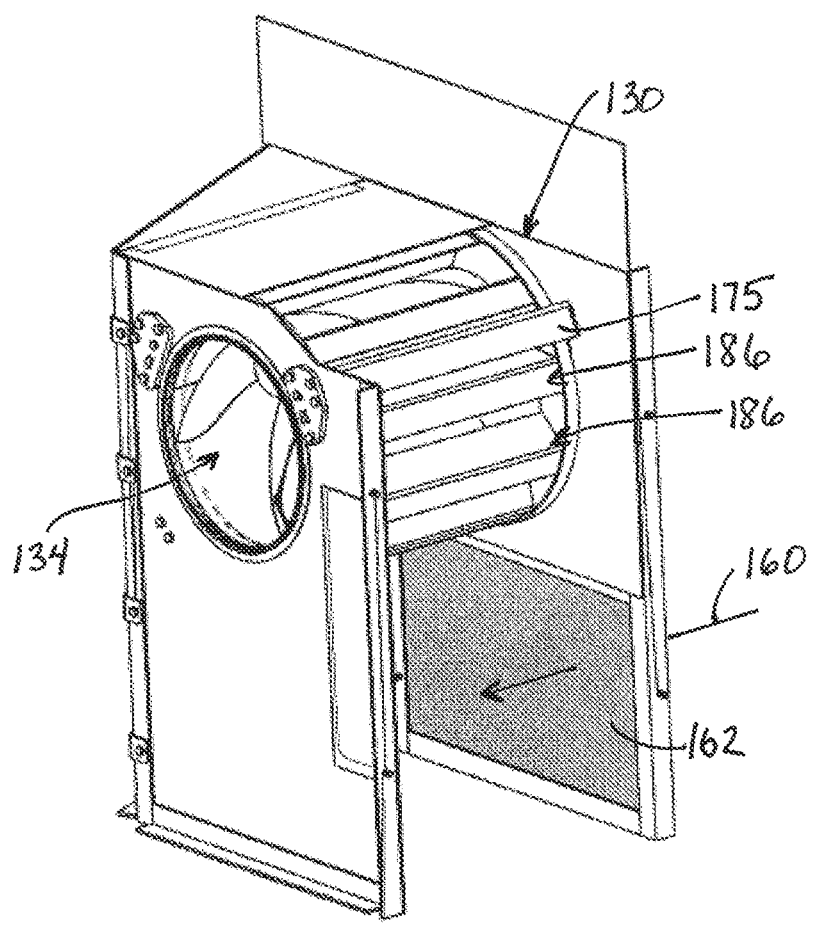

While the above-described embodiment shows a single rotating screen unit, embodiments with multiple rotating screen units are also contemplated, as suggested by the embodiment of FIG. 10. Here, the upright wall defining the inlet bay includes a lower screened section for drain down. In addition, one or more rotating screen units may be installed in various tanks (e.g., various sizes of manhole or vault configurations). Moreover, a baffle could be located between the tank inlet 14 and the inlet end 36 of the rotational screen to protect against large debris launching into the inlet end 36.

Referring now to FIGS. 11-20, another embodiment of a stormwater treatment device 110 includes a rectangular or other shape tank 112 (e.g., in this case, a concrete vault) with an inlet opening 114 and an outlet opening or openings 116 through the tank sidewall 118. An inlet pipe 120 connects to opening 114 and an outlet pipe/pipes 122 connect to the opening/openings 116. The tank includes an insert structure 130 that is configured to control flow through the tank. The tank insert 130 supports a rotatable screen unit 132 within the tank. The rotatable screen unit 132 is barrel-shaped (e.g., cylindrical (round or other), or cylindrical with tapered ends, or conical, or some other circumscribing tubular shape) to define a through path 134 with an inlet end 136 and an outlet end 138. The rotatable screen unit has a tubular screen structure 180 with a plurality of screening openings (not shown) for allowing passage of water therethrough while preventing passage of trash items. The rotatable screen unit 132 includes at least one internal blade 140 (e.g., one, two or more, or three or more, each running helically) within the through path 134 such that water and trash entering the inlet end 136 of the through path interacts with the internal blades 140.

The insert 30 is also configured to define an inlet bay 142, an outlet bay 144 and a trash bay 46. Here, the inlet bay 142 is located around the inlet 114 of the tank and to one side of the inlet, and feeds incoming water to the inlet end 36 of the through path 134. Notably, in the device 110', the infeed direction 143 of incoming water is not aligned, or substantially aligned, with the rotation axis 145 of the screen unit 132. Instead, incoming water is deflected by the housing of the insert (e.g., angled housing wall segment 147), which dissipates energy and protects the rotating screen unit 132 from large or heavy objects, and diverts objects toward the tank wall and away from the screen unit 132. The water then turns to flow into the through path 134, per exemplary flow arrows 149. Thus, the incoming direction 143 of the water flow to the tank 112 is, here, transverse, in particular, perpendicular or substantially perpendicular, to the rotation axis 145. The outlet bay 144 is located for delivering water to the outlet 116 of the tank. The trash bay 146 is located at the outlet end 138 of the rotating screen unit.

The insert also defines the support housing 152 for the rotatable screen unit 132. Within the support housing, a path or paths 154 are provided at an external surface side of the screen unit 132 for delivering water that passes through the screening openings to the outlet bay 144 without such water passing through the outlet end 138 of the rotatable screen unit 132 into the trash bay 146. Trash items that pass along the through path 134 and out of the outlet end 138 of the rotatable screen unit are captured within the trash bay 146.

The insert 130 also defines a flow path 160 from the trash bay 146 to the outlet bay 144, with a stationary screen unit 162 (aka trash bay screen) located along the flow path to maintain captured trash items with the trash bay. The helical configuration of the internal blades 140, in combination with the rotation of the screen unit 130, pushes trash items along the through path 134 and out of the outlet end 138 of the through path 134 into the trash bay 146.

Here, the inlet bay 142 is defined by the tank bottom wall 112a, upright tank side walls 112b (or portions thereof) and wall segments 152a (also 147) and 152b of the insert support housing 152. Wall segment 152b includes an opening 152e (i.e., the outlet opening of the inlet bay 142) to receive an end portion of the rotatable screen unit and carries bearing assemblies 174 to rotatably support the screen unit 30. An end wall segment 152c toward the outlet end of the screen unit also includes an opening and carries bearing assemblies 174 to rotatably support the screen unit 130. In this regard, the screen unit 130 includes the tubular screen structure 180 with the screening openings (not shown) and a frame structure with annular end panels 182, where each annular end panel 182 includes a peripheral rim 184 that is engaged by the bearing assemblies 174 (e.g., at each end, the rotating wheel 174a of a track bearing of each assembly 174 engages with the internal surface of the rim 184, and the rotating wheel 174b of a thrust bearing of the assembly engages the external face of the annular end panel 182). In this manner, the screen unit 130 is supported for free rotation by the bearing assemblies 174, and the thrust bearing of the assembly prevents axial movement of the screen unit 130. Notably, the bearing assemblies 174 at opposite ends of the rotating screen unit are interconnected by cross bars 175 to accurately separate the wall segments 152b and 15c while keeping those wall segments parallel. Additional cross bars 177, not associated with bearings, may also be provided between the wall segments 15b and 152c for such purpose. Crowned roller bearings may be used to provide self-alignment and minimize wear.

Notably, the frame structure of the screen unit 130 also includes a series of external drive paddles, which here take the form of wide V-shaped trough structures 186, at the external side of the tubular screen structure 180 to form a paddle wheel type structure. Each trough structure has a water flow capture face 188 (here the inside surfaces of the V-shape) and a water flow pass face 190 (here the outside surfaces of the V-shape). The trough structures are oriented so that water flow passing through the tubular screen structure 180 at the side of the path 134 near the tank inlet opening will be partially captured by the water flow capture faces 188, and any water flow passing through the screen structure toward the side of the path near the tank outlet opening will engage with and run off of the water flow pass faces 190. The combined effect is that the screened water that has passed through the tubular screen structure 180 interacts with the trough structures 186 in a manner to drive the rotation of the screen unit 130. Here, the helix angle of the internal blades 140 is particularly steep, and the blade height sufficient, to help drive the water higher on the screen structure 180 to provide more driving force for the system. By way of example, blade helix angles may be in the range of thirty to fifty-five degrees, but variations are possible.

The upright wall segment 152b is configured such that if flow into the tank exceeds a rated flow rate for treatment, causing the water level in the inlet bay 142 to rise, the water will overflow at the lower section of the wall segment 152b directly into the outflow bay 144.

The trash bay 146 is defined by the tank bottom wall 112a, upright tank side walls 112b (or portions thereof) and upright support housing wall segments 152c, 152a and 152d. Notably, here, the upper end of wall panel segment 152c extends to the top of the tank to prevent trash in the trash bay 146 from overflowing into the outlet bay 144. In some embodiments, this upper portion may also be formed by one or more screens that allow water flow from the trash bay to the outlet bay, while keeping trash in the trash bay. The outlet bay 146 is defined by the tank bottom wall 112a, part of the upright tank side wall 112b that includes the outlet opening 114, and upright support housing wall segments 152b, 152c and 152d.

In a typical installation, the tank includes a top wall (not shown) that may include an access opening (e.g., a manhole) to enable access to the internal space of the tank when the stormwater treatment device is installed in the field and/or a clean out hole or holes directly over the trash bay 146 or the other bays.

In operation, device 110 receives flow through the inlet pipe 120 which enters the inlet bay 142. The system is designed to treat a specific capacity of water called the treatment flow rate. The inlet bay 142 allows sediment, and any heavy trash and debris to settle. From the inlet bay 142, stormwater turns and travels into the rotating screen unit 130, which separates trash items from the water. If the system experiences flow higher than the treatment flow rate, water will spill over the lower portion of the wall segment 152b and into the outlet bay 144 and exit via the outlet pipe 122.

As described above, the rotating screen unit 130 is supported by the bearing assemblies 74, which allow the unit to rotate. The kinetic energy of the water is converted into rotational energy of the screen unit by the water passing through the screen and interacting with the trough structures. Water exits through the screening openings in the tubular screen structure 180, into the outlet bay 144 and then out via the outlet pipe 122. Multiple outlet pipes and/or angles of outlet pipe position may be used. Trash is separated from the stormwater as it passes through the rotating tubular screen structure 180 and is transported into the trash bay 146 via the internal blades 140. The combination of the trash migration across the screen and the turbulent water flow caused by deflection off the rotating blades 140 generates a scrubbing action, keeping the internal surface of the tubular screen structure clean. High water velocity across the screen at high flow conditions also keeps the screen clean to inhibit blinding of the screen. Here, the triple internal blades with long pitch configuration helps keep this velocity from stalling, transports trash through the system and pushes water higher up the side of the rotating screen unit, increasing system torque.

In one example, each of the three internal blades is configured such that the blade moves through ¾ of a helical turn along the entire axial length of the screen unit. So, the internal blade lead is ¾ of a helical turn per screening unit length. In such case, the screening unit needs to rotate ¾ of a revolution for a piece of trash to be transported thru the entire length of the screening unit. In other implementations, the number of blades and/or blade configuration could vary. For example, the blade arrangement could be implemented with each blade configured such that the blade moves through between ⅝ and ⅞ of a helical turn along the entire axial length of the screen unit. In another example, the blade arrangement could be implemented with each blade configured such that the blade moves through between ⅘ and ⅝ of a helical turn along the entire axial length of the screen unit. Still other variations are possible.

Figure 16A:
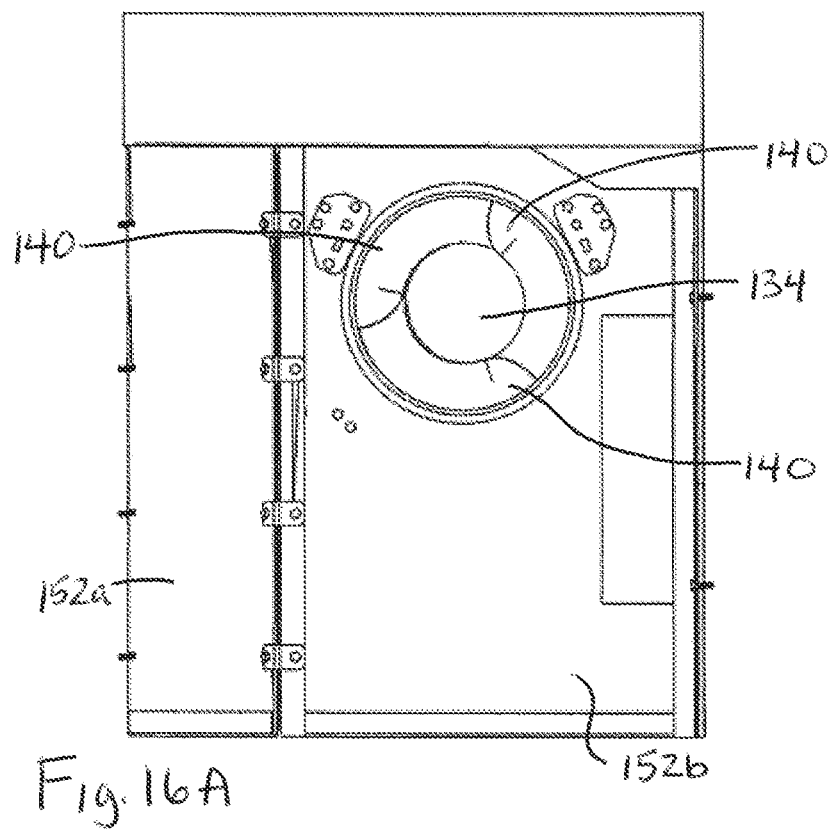
FIG. 16A shows a side elevation of the insert of FIGS. 14 and 15.
Figure 16B:
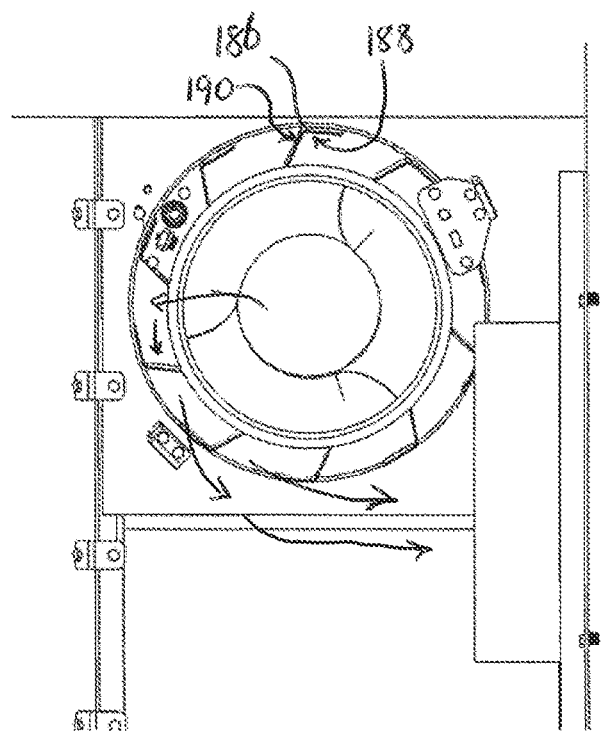
FIG. 16B shows a partial side elevation with some wall segments removed.
Figure 17:
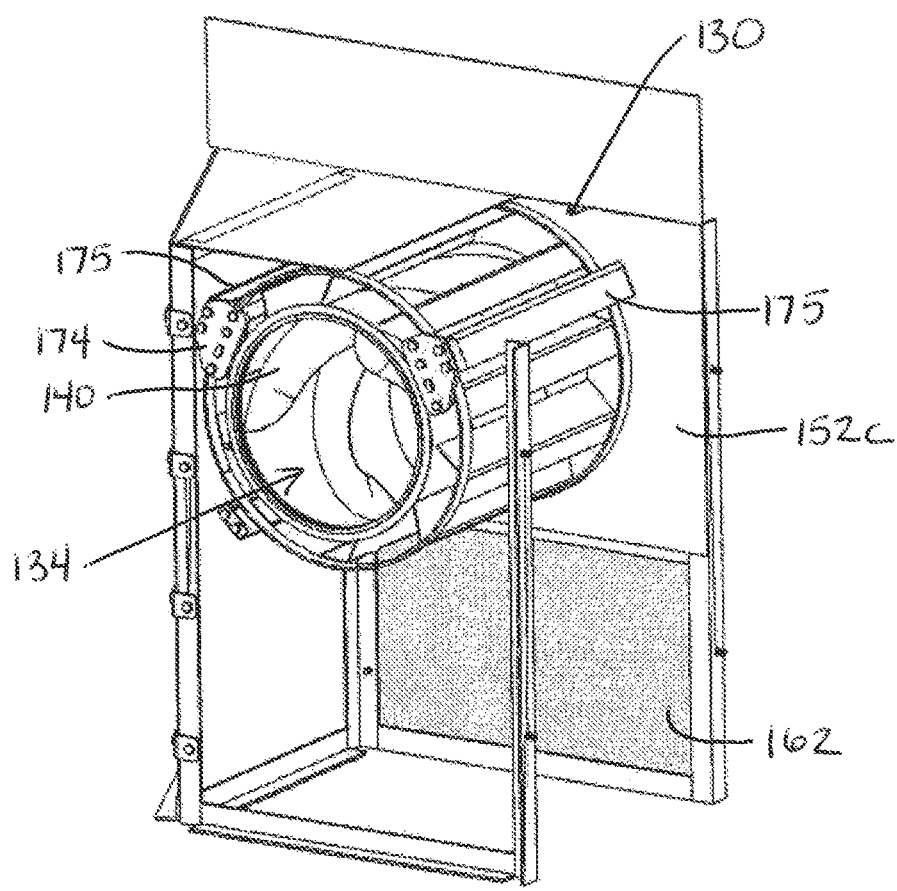
FIGS. 17-19 show partial perspective views of the insert with some components removed to expose the rotating screen unit structure.
Figure 18A:
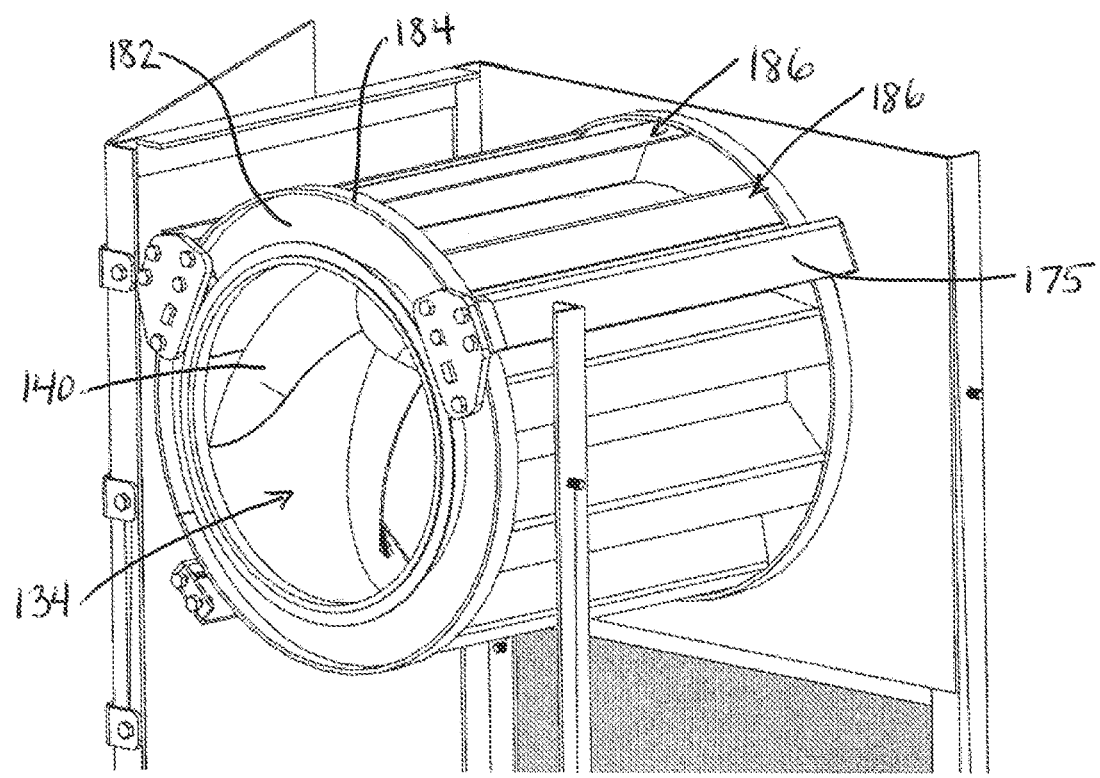
Figure 18B:
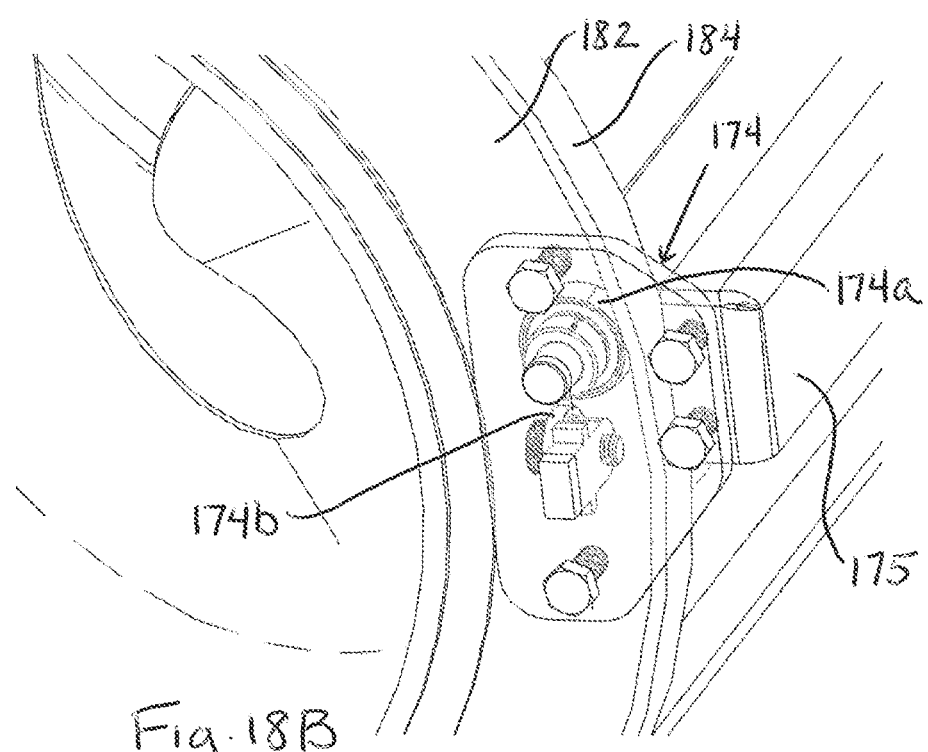
Figure 19:
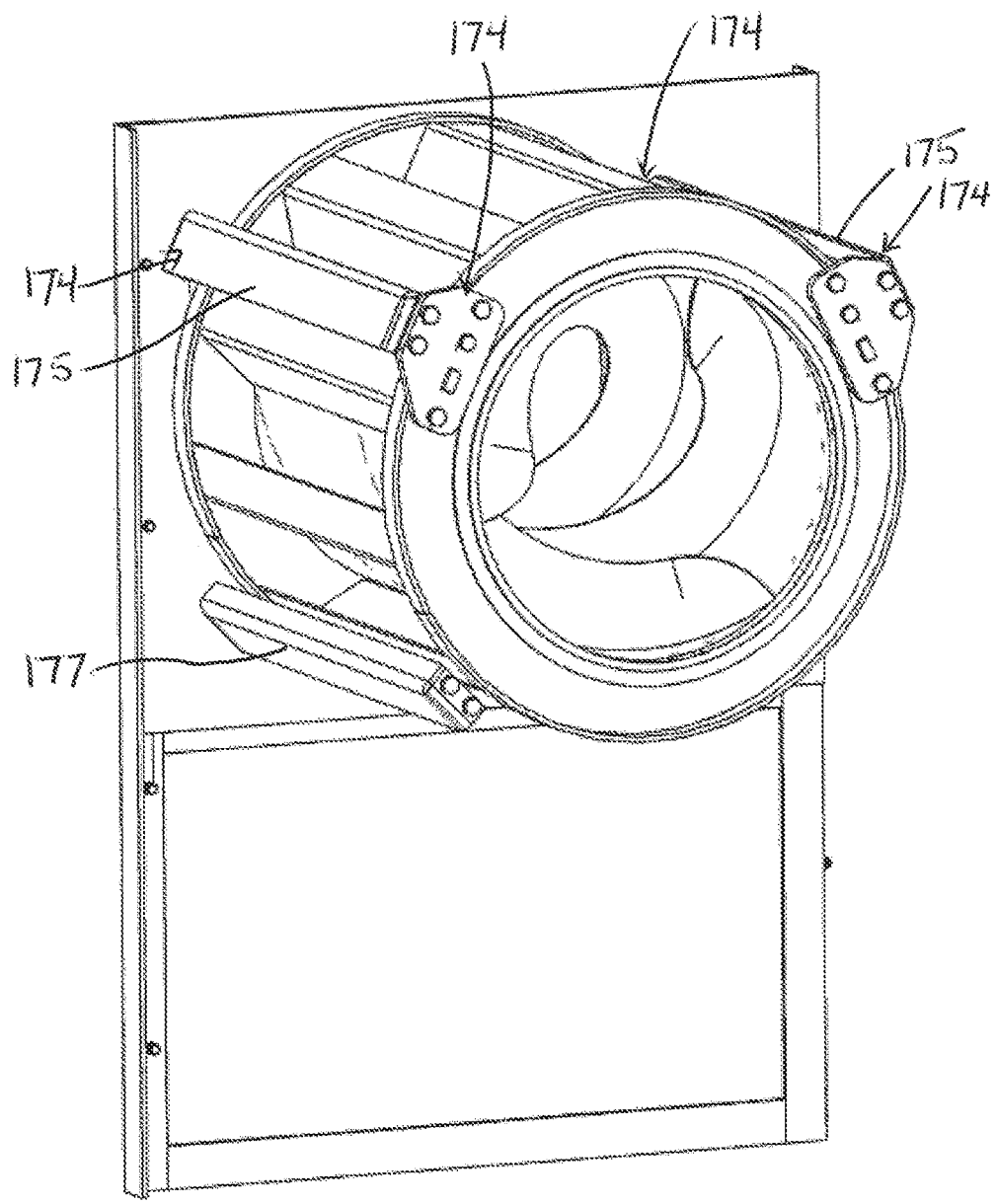

The paddle wheel frame structure of the screen unit 130 assures that, at high flows, water exits through the tubular screen structure screening openings and deflects off the outer troughs causing the assembly to rotate with added power from the water deflection impact. In addition, as seen in FIG. 16B, the water flow direction within the outlet bay toward the tank outlet is oriented to also drive the trough-shaped paddles. Thus, the screened water is the primary driver of rotation of the screen unit 130. At low flows, water exits through the screening openings of the tubular screen structure and fills the troughs, causing the system to rotate due to the weight of the water. If flow is too low to rotate the cylinder, the bottom of the tubular screen structure will blind with trash which causes the water elevation to rise and discharge into higher outer troughs. This causes rotation and cleans the blinded tubular screen structure, in return dropping the water surface elevation. This process is repeated and enables the rotating tubular screen structure cleaning action at all flow conditions.

Trash exits out of the rotating screen unit 130 and into the trash bay 146, which, in the illustrated embodiment, has no sump. But in some cases a sump could be provided in the trash bay. The trash bay screen 162 is positioned on the upright housing wall segment 152c under the rotating screen unit. The turbulent water exiting the rotating tubular screen structure falls to the tank bottom wall 152a and back flushes the trash bay screen 162. This constant action enables the screen 162 to stay clean and not blind. Multiple trash bay screens could be provided. The screen(s) 162 help regulate the water surface elevation inside the trash bay 146 and enables the system to drain down, particularly during lower flow rates through the rotating screen unit. At larger flows, water passes over the blades 140 of the screen unit, all the way through the through passage of the rotating screen unit 130.

Thus, the described stormwater treatment device provides numerous benefits, including the following.

The kinetic energy of the water entering the rotating screen unit 30 is translated into rotational energy, primarily by movement of the water to interact with the outer troughs. Due to the screen rotation and turbulent water flow, high- and low-pressure zones are created which allow the trash to be flushed from the low-pressure zones. This results in trash filled water always encountering clean screen enhancing the flow capacity and longevity of the system.

In the illustrated device 110, the internal surface side of the tubular screen structure 180 of the rotating screen unit 130 has two three equally spaced long pitch blades, each running helically. However, other blade configurations are possible. The blades have four main functions, as described above.

The tubular screen structure 180 is encircled by the troughs, which act as a paddle wheel for the unit. This is particularly important for lower flow rates to ensure the screen unit continues to rotate and facilitates self-cleaning. It also doubles as a structural frame member of the screen unit.

The suspended bearing design protects the system and keeps it out of the direct path of flow. The wheels are optimally spaced across the rotating screen unit to combat twisting and thrust forces. The bearing assembly may be of a quick release design for ease of maintenance.

The rotating screen unit 130 separates trash from stormwater and transports the trash it to the trash bay 146. Trash migrates through the rotating screen unit causing a scrubbing action which in return cleans the screen. Trash is stored in a designated area, the trash bay, for easier maintenance and it keeps the trash away from the screen so stored trash cannot re-enter the rotating screen unit and impede progress of incoming trash.

Figure 20:
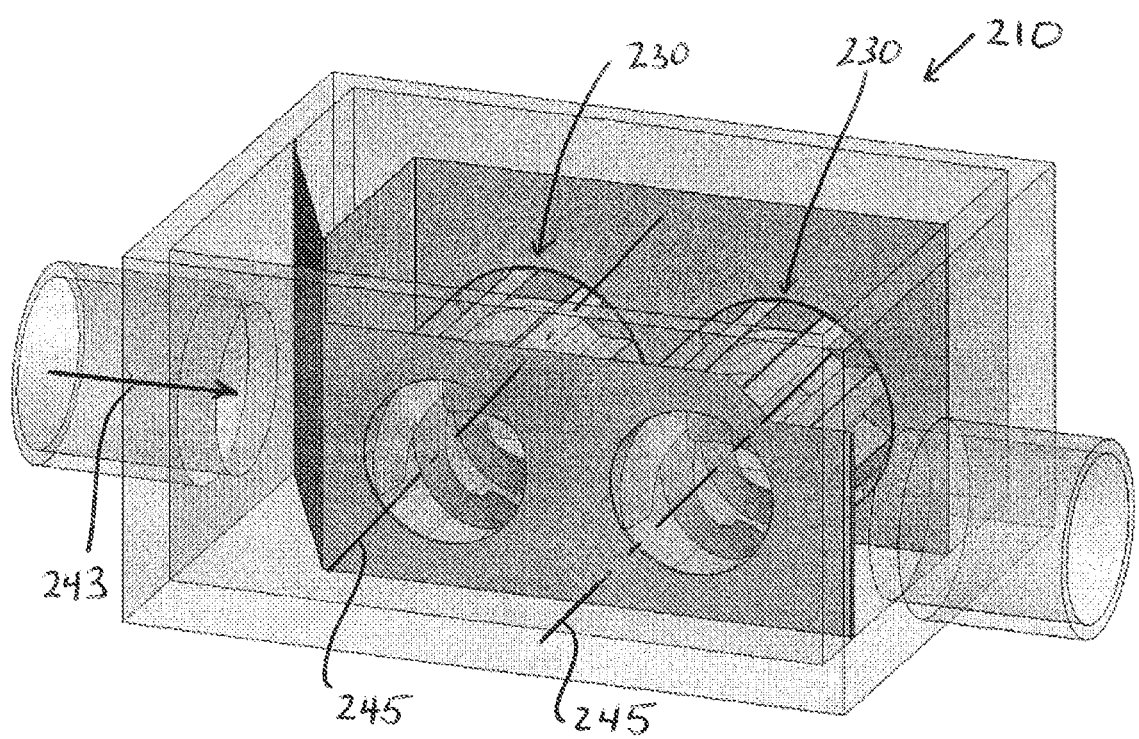
FIG. 20 shows a partial perspective view of another embodiment of a stormwater treatment device including multiple rotating screen units.

As seen in FIG. 20, a device 210 which includes two (or more) rotatable screen units 230, both having their rotation axes 245 oriented substantially perpendicular to the direction 243 of incoming water flow, is also possible. Here, the rotatable screen units 230 are located in parallel (i.e., parallel flows of water therethrough simultaneously). However, in other embodiments multiple rotatable screen units could be located in series (i.e., water and trash flow axially through a first rotatable screen unit, and then the trash and water that did not pass through the screen structure of the first rotatable screen unit then moves into the next rotatable screen unit.

While the rotating screen units are primarily shown with rotation axes that run substantially horizontally, embodiments in which the rotation axis runs at an incline from the inlet end to the outlet end, or at a decline from the inlet end to the outlet end, are also contemplated and possible.

The rotating screen units may incorporate brushes or other sealing mechanisms to seal trash from getting trapped in between the external side of the rotating screen unit and the walls or wall segments that define the outlet bay.

It is to be clearly understood that the above description is intended by way of illustration and example only, is not intended to be taken by way of limitation, and that other changes and modifications are possible. The scope of protection of each following claim shall only be limited by features expressly set forth in such claim.

The invention claimed is:

1. A stormwater treatment device, comprising:
    a tank defining an internal volume and having an inlet and an outlet;
    a rotatable screen unit mounted within the tank, the rotatable screen unit being barrel-shaped to define a through path with an inlet end and an outlet end, the rotatable screen unit includes a screen structure with a plurality of screening openings for allowing passage of at least some water from the through path outwardly through the screen structure while inhibiting passage of trash items through the screen structure such that trash items move along the through path from the inlet end to the outlet end;
    wherein the rotatable screen unit includes a plurality of external drive paddles that rotate with the screen structure and that drive rotation of the screen structure by interacting with water that has been screened by passing outwardly through the screen structure.

2. The stormwater treatment device of claim 1, wherein the rotatable screen unit further includes a plurality of internal blades, within the through path, and which rotate with the screen structure, wherein the internal blades are configured to direct at least some water moving along the through path upwardly along the screen structure.

3. The stormwater treatment device of claim 2, wherein each internal blade runs in a helical pattern along an internal surface of the screen structure, wherein each external drive paddle is configured as a trough structure.

4. The stormwater treatment device of claim 3, wherein the trough structure has a V-shaped end profile.

5. The stormwater treatment device of claim 2, wherein each internal blade is configured to push trash items along the through path and out of the outlet end of the through path.

6. The stormwater treatment device of claim 1, further comprising:
    an insert within the tank, the insert configured to define:
        an inlet bay into which water from the inlet of the tank flows, the inlet bay including an outlet opening positioned such that the inlet end of the through path is open to the inlet bay for water entry;
        an outlet bay for delivering water to the outlet of the tank;
        a trash bay located at the outlet end of the through path;
        a support housing for the rotatable screen unit, wherein the support housing defines a path at an external surface side of the screen structure for allowing at least some water that passes through the screening openings to move to the outlet bay without such water passing through the outlet end of the rotatable screen unit into the trash bay;
    wherein trash items that pass along the through path and out of the outlet end of the rotatable screen unit are captured within the trash bay.

7. The stormwater treatment device of claim 6, wherein the insert further comprises a flow path from the trash bay to the outlet bay, with at least one trash bay screen located along the flow path to maintain captured trash debris within the trash bay while allowing water that enters the trash bay to flow to the outlet bay.

8. The stormwater treatment device of claim 7, wherein the trash bay screen is located at a height to permit water level equalization between the trash bay and the outlet bay during lower flow conditions.

9. The stormwater treatment device of claim 1, further comprising:
an insert within the tank, the insert configured to define:
a support housing for the rotatable screen unit, the support housing carrying a plurality of bearing assemblies to permit rotation of the rotatable screen unit.

10. The stormwater treatment device of claim 9, wherein at least some of the bearing assemblies include a thrust bearing for limiting axial movement of the rotatable screen unit and a track bearing to support rotation of the rotatable screen unit.

11. The stormwater treatment device of claim 1, further comprising:
an insert within the tank, the insert configured to define:
an inlet bay into which water from the inlet of the tank flows, the inlet bay including an outlet opening positioned such that the inlet end of the through path is open to the inlet bay for water entry;
an outlet bay for delivering water to the outlet of the tank;
a trash bay located at the outlet end of the through path.

12. The stormwater treatment device of claim 11, wherein the insert is further configured to define a path at an external surface side of the screen structure for delivering at least some water that passes through the screening openings to the outlet bay and toward the outlet of the tank without such water passing through the outlet end of the rotatable screen unit into the trash bay, wherein at least part of that path extends under the rotatable screen unit in a direction to continue to drive the rotatable screen unit as the water moves toward the outlet of the tank.

13. The stormwater treatment device of claim 1, wherein the rotatable screen unit is a first rotatable screen unit, and the device further comprises a second rotatable screen unit, the second rotatable screen unit being barrel-shaped to define a second through path with an inlet end and an outlet end, the second rotatable screen unit having a second screen structure with a plurality of screening openings for allowing passage of water therethrough while inhibiting passage of trash items through the screening openings of the second screen structure such that trash items move along the second through path from the inlet end to the outlet end, wherein the second rotatable screen unit includes a plurality of external drive paddles that rotate with the second screen structure and that interact with water that has been screened by passing outwardly through the second screen structure interacts with the external drive paddles to cause rotation of the second rotatable screen unit.

14. The stormwater treatment device of claim 1, wherein the rotatable screen unit is oriented such that a rotation axis of the rotatable screen unit runs transverse to an inlet flow direction of water flowing into the inlet of the tank.

15. The stormwater treatment device of claim 14, wherein the rotation axis runs substantially perpendicular to the inlet flow direction.

16. The stormwater treatment device of claim 14, further comprising a wall member that deflects water entering the inlet of the tank to dissipate energy.

17. A stormwater treatment device, comprising:
a tank defining an internal volume and having an inlet and an outlet;
a rotatable screen unit mounted within the tank, the rotatable screen unit being barrel-shaped to define a through path with an inlet end and an outlet end, the rotatable screen unit having a plurality of screening openings for allowing passage of water therethrough while preventing passage of trash items through the screening openings so that trash items within the through path move from the inlet end to the outlet end;
wherein the rotatable screen unit has a rotation axis that runs transverse to an inlet flow direction of water entering the inlet;
wherein a wall is located in the tank and configured and positioned such that stormwater flowing in the inlet flow direction into the tank impinges on the wall to dissipate energy and divert the stormwater toward the inlet end of the rotatable screen unit.

18. The stormwater treatment device of claim 17, wherein the rotation axis runs substantially perpendicular to the inlet flow direction.

19. The stormwater treatment device of claim 17, wherein the rotatable screen unit includes:
(i) at least one internal blade within the through path such that water entering the inlet end of the through path interacts with the internal blade to move upward along a height of the rotatable screen unit; and
(ii) a plurality of external paddles that are oriented such that screened water that passes through the screening openings drives rotation of the rotatable screen unit.

20. The stormwater treatment device of claim 17, wherein:
the wall is part of an insert that includes structure that supports the rotatable screen unit; or
the wall is solid without any openings therethrough.

21. The stormwater treatment device of claim 17, wherein:
the wall is part of an insert that includes structure that supports the rotatable screen unit; and
the wall is solid without any openings therethrough.

22. A method of treating stormwater, comprising:
flowing stormwater into a tank in which a rotatable screen unit is located, the rotatable screen unit shaped to define an axial through path with an inlet end and an outlet end, the rotatable screen unit having a plurality of screening openings for allowing passage of stormwater therethrough while preventing passage of trash items through the screening openings;
flowing the stormwater into the inlet end of the rotatable screen unit, wherein at least some stormwater passes through the screening openings for screening and interacts with externally located drive blades of the rotatable screen unit to drive rotation of the rotatable screen unit.

\* \* \* \* \*